United States Patent

Naefe

[11] 4,209,492
[45] Jun. 24, 1980

[54] ARRANGEMENT FOR THE PRODUCTION OF SPHERICAL PARTICLES FROM DROPS OF AQUEOUS NITRATE SOLUTIONS OF URANIUM, PLUTONIUM OR THORIUM, OR MIXTURES OF THESE MATERIALS FOR FUEL AND BREEDER ELEMENTS FOR NUCLEAR REACTORS

[75] Inventor: Paul Naefe, Aachen, Fed. Rep. of Germany

[73] Assignee: Kernforschungsanlage Julich, Gesellschaft mit beschrankter Haftung, Julich, Fed. Rep. of Germany

[21] Appl. No.: 890,990

[22] Filed: Mar. 28, 1978

[30] Foreign Application Priority Data

Apr. 2, 1977 [DE] Fed. Rep. of Germany ....... 2714873

[51] Int. Cl.² .............................................. G21C 3/42
[52] U.S. Cl. ............................. 422/159; 252/301.1 S; 264/0.5
[58] Field of Search ................. 252/301.1 S; 239/122, 239/103, 104; 264/0.5; 422/159

[56] References Cited

U.S. PATENT DOCUMENTS

| | | | |
|---|---|---|---|
| 1,803,967 | 5/1931 | Good | 239/103 |
| 3,886,086 | 5/1975 | Simpson | 252/301.1 S |
| 3,933,679 | 1/1976 | Weitzel et al. | 252/301.1 S |
| 4,057,616 | 11/1977 | Wolfangel | 252/301.1 S |
| 4,060,497 | 11/1977 | Huschka et al. | 252/301.1 S |

FOREIGN PATENT DOCUMENTS 1317388 5/1973 United Kingdom .

Primary Examiner—Brooks H. Hunt
Assistant Examiner—Deborah L. Kyle
Attorney, Agent, or Firm—Scully, Scott, Murphy & Presser

[57] ABSTRACT

An arrangement for the production of spherical particles from drops of aqueous solutions of nitrates constituted of uranium, plutonium or thorium, as well as mixtures of these materials for the fuel and breeder elements for nuclear reactors. The arrangement includes a receptacle for an aqueous and a superimposed gaseous ammonia phase, as well as a spray nozzle for producing the drops which is provided with a vibrator and is in communication with a receptacle for the fuel or breeder material solution, wherein the drops traverse the ammonia gas phase under the influence of gravity and also a horizontally-directed force, while traversing the aqueous ammonia phase under only the influence of gravity.

7 Claims, 1 Drawing Figure

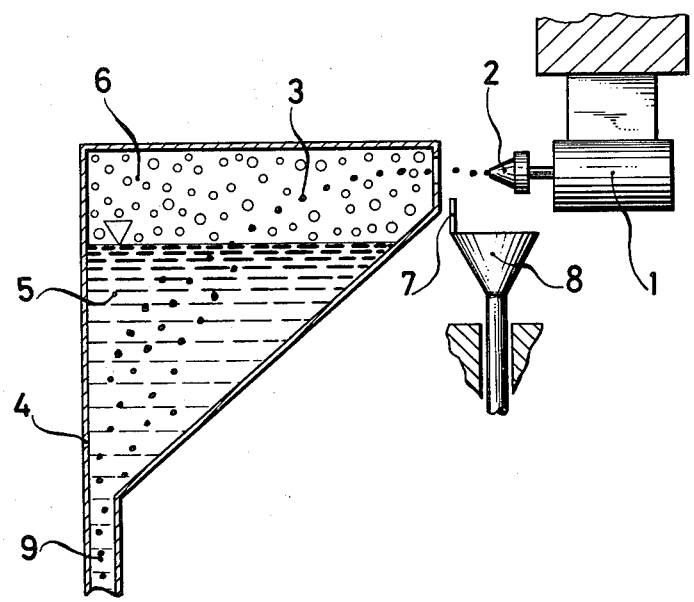

ns there is exhibited the disadvantage of the formation of an unequal drop size.

ARRANGEMENT FOR THE PRODUCTION OF SPHERICAL PARTICLES FROM DROPS OF AQUEOUS NITRATE SOLUTIONS OF URANIUM, PLUTONIUM OR THORIUM, OR MIXTURES OF THESE MATERIALS FOR FUEL AND BREEDER ELEMENTS FOR NUCLEAR REACTORS

BACKGROUND OF THE INVENTION

1. Field of the Invention

The present invention relates to an arrangement for the production of spherical particles from drops of aqueous solutions of nitrates constituted of uranium, plutonium or thorium, as well as mixtures of these materials for the fuel and breeder elements for nuclear reactors; which consists of a receptacle for an aqueous and a superimposed gaseous ammonia phase, as well as a spray nozzle for producing the drops which is provided with a vibrator and is in communication with a receptacle for the fuel or breeder material solution, wherein the drops traverse the ammonia gas phase under the influence of gravity and also a horizontally-directed force, while traversing the aqueous ammonia phase under only the influence of gravity.

Fuel or breeder material particles of that type are utilized, in a first instance, in the production of fuel and/or breeder elements for high-temperature reactors. Thereby, it is important that the fuel or breeder material particles are obtained in the most possible uniform size and herewith evidence a good spherical shape.

2. Discussion of the Prior Art

In the present state of the technology it is known that such fuel or breeder material particles can be produced in that initially there is formed a nitrate solution from the fuel material or the breeder material, and this solution is thereafter divided into drops, then travels through a gaseous ammonia phase for stabilization and subsequent thereto through a liquid ammonia phase, while a portion of the solidification process is anticipated by addition of ammonia to the fuel and breeder material solution prior to dissipation into drops.

In order to divide the solution of the fuel material or breeder material into drops and to effectuate the solidification; pursuant to a process known from energia nucleare "The SNAM Process for the Preparation of Ceramic Nuclear Fuel Microspheres: Laboratory Studies", April 1970, Issue 4, Volume 17, by G. Brambilla, P. Gerontopulos, D. Neri; spray nozzles are perpendicularly arranged over a precipitation/gelation column formed from a gaseous ammonia phase and a liquid ammonia phase, above which the stream emanating therefrom is divided into individual drops by vibration. Inasmuch as the drops of the fuel or breeder material solution are initially travelling through a gaseous ammonia phase, there is achieved the formation of a shell of sufficient solidity for these drops so as to be able to withstand the impact on the liquid ammonia phase without permanent deformation or even fragmentation. However, in this known arrangement there was encountered the disadvantage that there had to be taken into consideration either extremely large dropping heights, meaning dropping heights of a number of meters, in order to attain the conditions desired in actual practice, or the impact of the drops on the aqueous ammonia phase was so large as to lead to non-uniform and unequally sized particles.

In order to avoid these disadvantages, viscosity increasing substances, such as polyvinyl alcohol, have also been previously added to the fuel or breeder material solution so as to, in this manner, increase the inherent stability of the particles which are to be formed. Nevertheless, it was disadvantageous in this process that this necessitated additional and, consequently, cost-increasing measures in the production of the particles.

Furthermore, also known is a process for the production of fuel and/or breeder material particles in which an injection nozzle is directed from above at an angle of about 10° to 45° towards the surface of an organic liquid located in the receptacle at a small perpendicular distance from the nozzle, and provided for the solidification of the drops formed from the fuel or breeder material solution (German Laid-Open Patent Application No. 2,150,474). Through the angular positioning of the nozzle, and as a result of the low dropping height due to the small distance from the surface of the liquid, there is to be avoided that the drops which are injected from the nozzle will impact with force on the liquid surface. The additionally provided liquid hereby evidenced such a composition that a shell formation for the drops became superfluous prior to the passage into the liquid phase serving for solidification. However, it is disadvantageous, as has been indicated, that in this process there concurrently is not precluded the deformation of the drops, so that the particles formed therefrom are, to a considerable extent, not spherical. A further serious disadvantage is encountered in that, due to the interposition of a liquid preceding the passage into the phase serving for solidification there occurred a recombination of the separated drops, so that the particles produced pursuant to this process, additionally, appeared in considerably different sizes.

SUMMARY OF THE INVENTION

Accordingly, it is an object of the present invention to provide an arrangement through the intermediary of which there can be produced, with assurance, uniformly sized fuel material or breeder material particles evidencing a good spherical configuration. Furthermore, this is to increase the economic efficiency of production as compared to known processes.

The foregoing object is attained by an arrangement of the type described above, pursuant to the invention, in that the receptacle for the aqueous and gaseous ammonia phase has the top thereof closed and incorporates a side opening in its upper portion which is located opposite to the nozzle, and wherein this nozzle is so oriented that the liquid jet therefrom, which is divided into drops, enters horizontally into the ammonia gas phase and is therein diverted into the aqueous ammonia phase under the influence of gravity.

Presently, a process has also become known for the production of spherically-shaped particles from drops of aqueous nitrate solutions of fuel material for nuclear reactors, wherein the drops in the gaseous ammonia phase are subjected to a horizontal force and gravity, and in the aqueous ammonia phase are subjected to gravity (German Published Patent Specification No. 2,459,445). For effectuation of this process there is provided a vertical arrangement of the nozzles which, after setting of the steady-state jet breakup condition and withdrawal of a receiving receptacle or funnel, are lowered into an operative position; should the drop generation be terminated, then the nozzles are raised and a vessel or funnel moved into position; nevertheless, during the respective lowering and raising of the nozzles the danger exists that at this time there will be produced fuel and/or breeder material particles which will not conform to the prescribed specification. A further disadvantage is that in case of disruptions of the uniform jet breakup as a result of the necessary raising of the nozzles for eliminating the disruption, a certain time is required until it is possible to prevent the entry of solution into the gelification column. This does not only lead to the result that the herein produced particles are scrap, but also that this scrap must be sorted out later on in the process.

In contrast therewith, in the utilization of the arrangement pursuant to the invention, the presently provided nozzles are introduced and withdrawn into the current operative position in a horizontal direction. Thereby, as soon as a disruption can be ascertained, it is possible to prevent immediately solution from entering the gelification container.

A further advantage of the arrangement pursuant to the invention consists of in that the dropping velocity of the produced drops increases only slightly in the horizontal arrangement provided herein. As a result, the impact force of the semi-solid spheres, which are pre-hardened in the $NH_3$ gas phase, on the surface of the aqueous ammonia phase is considerably lower than that in a vertical arrangement. Therefore, the danger of deformation is reduced.

Finally, a further advantage of the arrangement according to the invention is that the $NH_3$ gas cannot reach the nozzle and thereby disturb the drop generation, whereas in the heretofore known arrangements, in spite of aspiration at the gelification container, this will occasionally flash over and rise upwardly.

The particles which are produced through the intermediary of this arrangement collectively have a uniform spherical shape. This has been achieved in that the drops travel for so long through the gas phase until they evidence a sufficiently stable shell, so as to traverse the boundary between the gaseous and aqueous ammonia phases without encountering any damage. Concurrently, utilization of the arrangement will avoid that, as a result of gravity, the speed of the drops is increased to such an extent that the encompassing shell formed in the gas phase due to the increasing velocity of the drops will not be adequate to prevent a permanent deformation.

In lieu of a single nozzle it may be suitable that the open side of the receptacle be located opposite a plurality of nozzles arranged in a row or in an arc. In that instance, the throughput is considerably increased.

In order to achieve that the arrangement evidences the greatest possible space-saving configuration, it is advantageous that the lower limit imparted to the width of the receptacle corresponds to the total width of the collective liquid streams or jets which are injected by the nozzles into the gas phase. Hereby, there is additionally achieved that the quantity of the phase serving for solidification is reduced to a minimum.

In order to prevent the occurrence of unequally sized particles at the approach or withdrawal of the arrangement caused by the initially first increasing or decreasing stream separating into drops, meaning prior to reaching the fixed stream formation, an advantageous embodiment of the invention contemplates that a diaphragm which is vertically displaceable within defined limits is interposed intermediate the open side of the receptacle and the orifices of the nozzles, which in one end positon thereof will prevent the entry of the liquid jet stream from the nozzles into the gaseous ammonia phase. Hereby it is purposeful that the lower portion of the diaphragm be connected with a funnel. Through the foregoing, the solution can be withdrawn in a simple manner.

BRIEF DESCRIPTION OF THE DRAWINGS

An examplary embodiment of an arrangement for effectuating the invention is now schematically illustrated in the accompanying single FIGURE of the drawing, and is described in greater detail hereinbelow.

DETAILED DESCRIPTION

The stream 3, which is dispersed into drops, exits initially horizontally from nozzle 2 communicating with the vibrator 1 and with the receptacle (not illustrated in the drawing) for the fuel material or breeder material solution, enters through an opening provided in the upper portion of the receptacle 4 guided into the gaseous ammonia phase 6 above the liquid level of the aqueous ammonia solution 5 in the receptacle and is deflected therein under the influence of gravity.

In order to avoid that, during the approach procedure or during the withdrawal procedure, there will be produced particles which are not sufficiently uniform since no steady-state jet breakup has formed as yet, or this stream collapses, additionally there is so arranged a diaphragm 7 which is displaceable within limits in a perpendicular direction, that the diaphragm covers the inlet opening to the receptacle 4 in one of its two end positions. Moreover, the diaphragm 7 is so connected with a funnel 8, that the liquid emanating from the nozzle is diverted through the funnel 8 when the diaphragm is closed. The fuel material or breeder material particles which are formed as a result of their solidification in the receptacle 4 are withdrawn through a discharge or outlet 9 provided for this purpose. In order to prevent the gaseous ammonia phase from reaching the nozzle 2, there must additionally be provided an aspirating or suction installation (not shown).

What is claimed is:

1. In an arrangement for the production of spherical particles from drops of aqueous solutions of nitrates constituted of uranium, plutonium or thorium, as well as mixtures of these materials for the fuel and breeder elements for nuclear reactors; a receptacle for an aqueous and a superimposed gaseous ammonia phase; and a spray nozzle for producing said drops including a vibrator and being in communication with a receptacle for the fuel or breeder material solution, said drops being adapted to traverse the ammonia gas phase under the influence of gravity and a horizontally-directed force, while traversing the aqueous ammonia phase under only the influence of gravity; the improvement comprising: said receptacle for said aqueous and gaseous ammonia phase having the top thereof closed; a side opening in the upper portion of said receptacle being located opposite said nozzle, said nozzle being oriented whereby the liquid stream emanating therefrom and dispersed into drops enters horizontally into said ammonia gas phase and therein is deflected into said aqueous ammonia phase under the influence of gravity.

2. An arrangement as claimed in claim 1, comprising a plurality of said nozzles being located opposite said side opening in said container.

3. An arrangement as claimed in claim 2, said nozzles being arranged in a row opposite said side opening in said receptacle.

4. An arrangement as claimed in claim 2, said nozzles being arranged in an arc opposite said side opening in said receptacle.

5. An arrangement as claimed in claim 2, wherein the lower limit of the width of said receptacle corresponds to the collective width of the liquid streams injected by said nozzles into said gas phase.

6. An arrangement as claimed in claim 2, comprising a diaphragm being positioned intermediate said open side of said receptacle and the orifice of said nozzles, said diaphragm being vertically displaceable within predetermined bounds and in one end position thereof adapted to prevent entry of the liquid stream from said nozzles into said gaseous ammonia phase.

7. An arrangement as claimed in claim 6, comprising a funnel connected with the lower portion of said diaphragm.

* * * * *